United States Patent [19]

Fujita

[11] E Re. 29,727

[45] Reissued Aug. 8, 1978

[54] DIGITAL DISPLAY DEVICE

[75] Inventor: Kinji Fujita, Shimosuwa, Japan

[73] Assignee: Kabushiki Kaisha Suwa Seikosha, Tokyo, Japan

[21] Appl. No.: 628,010

[22] Filed: Nov. 3, 1975

Related U.S. Patent Documents

Reissue of:

[64] Patent No.: 3,781,863
Issued: Dec. 25, 1973
Appl. No.: 209,986
Filed: Dec. 20, 1971

[30] Foreign Application Priority Data

Dec. 23, 1970 [JP] Japan ..... 45-116254

[51] Int. Cl.[2] ..... G02F 1/13; G09F 9/32

[52] U.S. Cl. ..... 340/336; 313/513; 340/378 R; 350/333

[58] Field of Search ..... 340/336, 378 R; 313/510, 517, 513; 350/160 LC

[56] References Cited

U.S. PATENT DOCUMENTS

| | | | |
|---|---|---|---|
| 3,505,804 | 3/1970 | Hofstein | 58/23 R |
| 3,566,391 | 2/1971 | Lally | 340/336 |
| 3,580,421 | 5/1971 | Bickford | 340/336 X |
| 3,646,544 | 2/1972 | Yamaguchi | 340/324 R |

*Primary Examiner*—David L. Trafton

*Attorney, Agent, or Firm*—Blum, Moscovitz, Friedman & Kaplan

[57] ABSTRACT

In an improved digital display device relying on the phenomenon of dispersion of incident light by nematic crystals across which an electric field is imposed, an arrangement of transparent conductive segments in groups on opposing parallel plates makes it possible to reduce the number of leads necessary for displaying any digit from zero to nine from the conventional eight leads to six leads. The impressed voltage necessary for causing the nematic liquid crystals to disperse light is applied in pulses to different segments in each group in succession, the pulses being supplied at a sufficiently high frequency so that each pulsed segment appears to be continuously actuated.

12 Claims, 10 Drawing Figures

DIGITAL DISPLAY DEVICE

Matter enclosed in heavy brackets [ ] appears in the original patent but forms no part of this reissue specification; matter printed in italics indicates the additions made by reissue.

BACKGROUND OF THE INVENTION

In a conventional digital display device wherein nematic liquid crystals are confined between two parallel plates, at least one of which must be transparent, seven conductive segments with associated leads are affixed to one plate, and a single conductive region with an associated lead is affixed to the second plate. At least those conductive segments on the transparent plate must also be transparent. The seven segments on the one plate are essentially straight and are in the form of a FIG. 8. The single conductive area on the second plate must be large enough to oppose all of the seven conductive segments on the first plate.

To operate the device, a total of eight leads to the seven segments on one plate and the single segment on the other plate is necessary. Where it is desired to display hours, minutes and seconds in a wrist watch, then a total of 42 leads must be attached to one of the plates. This is extremely inconvenient in the case of a wrist watch, considering the limitation on the amount of space available for attaching so many leads.

SUMMARY OF THE INVENTION

A digital display device holds nematic crystals in a sealed chamber between two opposing plates, at least one of which is transparent. For the display of a single digit between zero and nine, embodiments are presented which have two conductive segments on one plate and four conductive segments on the opposing plate, each set of six conductive segments on two opposing plates sufficing to display any digit between zero and nine when properly actuated. The segments on the two plates are connected to a source of voltage so constructed that pulses can be supplied sequentially to selected conductive segments. The sequence of pulses is rapid enough so that retention of the image by the human eye gives the impression of continuous actuation. This type of pulsed actuation is necessary for the formation of certain of the digits.

Using the segmental design of the present invention, the hour, the minute and the second can be displayed with only twelve leads from one plate and four leads from the other, making a total of 16.

Accordingly, an object of the present invention is to provide an improved digital display device wherein the number of conductive leads necessary is minimized.

Another object of the invention is to provide an improved digital display device wherein the space occupied by conductive leads is minimized.

A further object of the invention is to provide an improved digital display device suitable for use with a wrist watch, which is capable of displaying the hour, the minute and the second with a minimum of conductive leads.

Still another object of the invention is to provide an improved digital display device wherein a plurality of conductive segments forming characters are connected in parallel.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
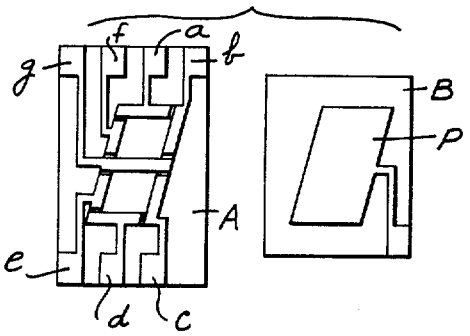
FIG. 1 is a plan view of the prior art arrangement for displaying any digit between zero and nine.
Figure 2:
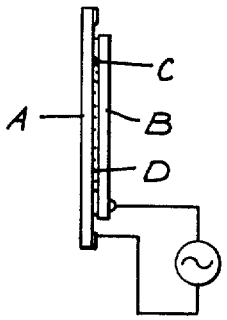
FIG. 2 is a side view of the device of FIG. 1 where the device is indicated as being connected to a source of alternating current.

In a conventional digital display arrangement using liquid crystals, a sealed chamber is formed of plates A and B with suitable gaskets where plate A has seven segments thereon with accompanying leads as indicated by the letters a through g. Plate B has on it a single conductive area and lead where the conductive area is so shaped that when plate A and B are opposed to each other, conductive [are] *area* p opposes all parts of the segments on plate A. The conventional arrangement, as can be seen, requires seven electrical connections to plate A and one electrical connection to plate B. A side view of the prior art arrangement of FIG. 1 is shown in FIG. 2 where it is indicated that panels A and B are connected to a source of alternating current. For a six digit display, one panel would require forty-two lead-out terminals while the other panel would require only one, since all of the areas having the shape shown at p could be in parallel.

Figure 3:
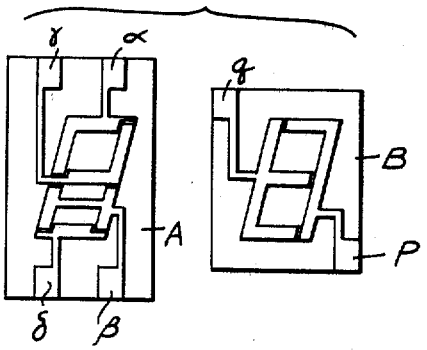
FIG. 3 is a plan view of each of the two plates constructed in accordance with the present invention for showing any digit between zero and nine.
Figure 4A:
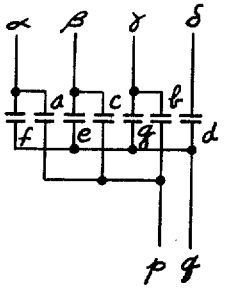
FIG. 4(a) shows the equivalents of the driving circuits for operating the conventionally segmented device and the device of the present invention.
Figure 4B:
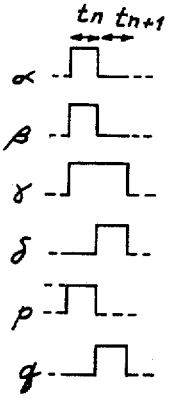
FIG. 4(b) shows the pulse sequence necessary for displaying the digit 3 by means of the device of the present invention.

In the embodiment of the present invention shown in FIG. 3, panel A has four segments thereon and panel B has two segments thereon making a total of six segments to which an equivalent number of lead-out terminals must be connected. In panel A, terminal alpha leads to the segments a and f of FIG. 1, terminal beta leads to c and e, terminal delta leads to d and terminal gamma leads to b and g [delta leads to d]. The electrodes on panel B are labelled p and q and, in combination, have the shape of FIG. 8. The correspondence between the segments of the FIG. 3 display and the segments of the FIG. 1 display is shown in FIG. 4(a). To form any required digit from zero to nine, the terminals on panel A and on panel B of FIG. 3 are selectively switched. The switching sequence is shown in FIG. 4(b) for formation of the digit 3. During the period labelled $t_n$, alpha, beta, and gamma on panel A are connected to one terminal of a voltage source and lead p on panel B is connected to the other terminal of the voltage source. During this period segments a, c and d, as shown in FIG. 1, are actuated.

During the period $t_{n+1}$, gamma and delta on panel A and q on panel B are connected to the voltage source. During this pulse, segments corresponding to g and d of FIG. 1 are actuated. The pulses are provided at a frequency such that retention of the image gives the impression of continuous actuation.

Using similar techniques, any digit from zero to nine can be formed by the arrangements of segments shown in FIGS. 3, 5a, 7a and 7b.

Figure 5A:
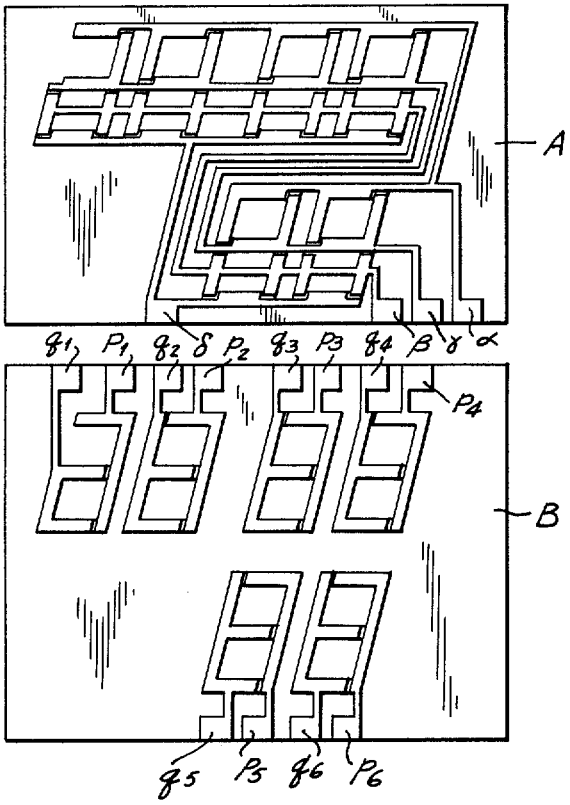
FIG. 5(a) is a pair of panels for showing six digits simultaneously.
Figure 5B:
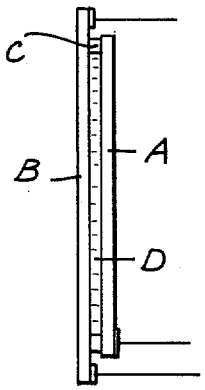
FIG. 5(b) is a side view thereof.

Panels A and B, suitable for showing six digits within a restricted space and with many fewer lead-out connections than are needed in the conventional arrangement, are shown in FIG. 5. In panel A all of the segments corresponding to a single letter (Greek) are in parallel. Part of the alpha segment corresponding to segment f of FIG. 1 is omitted from the top left hand group of segments because only the numbers 1 and 2 need be displayed. Each of the segments in each of the digital display groups on panel B is individually connected to the voltage source. Consequently, the total number of lead-out connections required for a six-digit display with the arrangement of the present invention is only sixteen as against forty-three for the conventional design. An assembled six-figure display unit in accordance with the present invention is shown in side view in FIG. 5(b) where C is a gasket spacer and D is a liquid crystal material. The method of actuating a six-figure display panel such as is shown in FIG. 5 is shown diagrammatically in FIG. 6. Clock pulses i entering Timer Coder 1 are changed into signals B, C, and D which are transferred to Decoder 2. Decoder 2 converts signals B, C and D into signals for driving the electrodes from alpha to delta. Scanner circuit 4 scans signals B, C and D and the synchronous signal S supplied from Time Coder 1. The combinations of signals from Decoder 2 and Scanner Circuit 4 produces the desired digital display of the time as shown on display panel 3.

Figure 6:
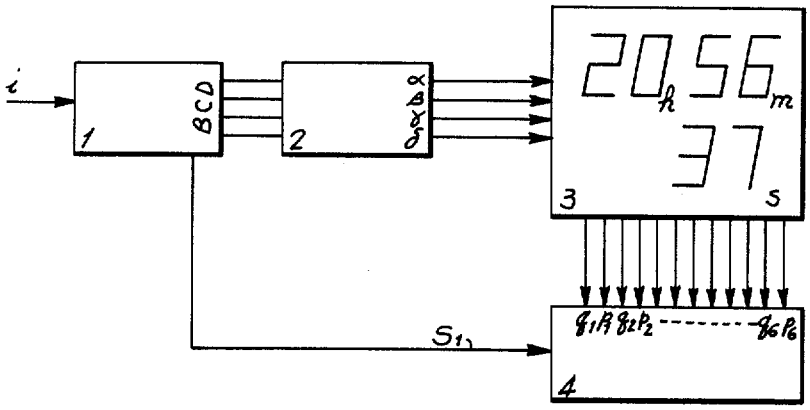
FIG. 6 is a diagrammatic representation of the circuit to be used in combination with a display panel in accordance with the present invention.

As is obvious, the driving method of FIG. 6 can be readily modified to operate display panels having fewer or more than six digits and can also operate displays where each digit consists of a number of segments differing from those shown in the embodiments thus far.

Figure 7A:
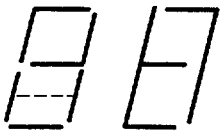
FIGS. 7(a) and 7(b) are further embodiments of segment arrangements for showing digits.
Figure 7B:
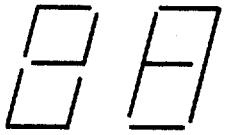

Embodiments using four segments on panel A (one segment consisting of two, electrically connected bars) and two segments on panel B and three segments on panel A and three segments on panel B are shown respectively in FIGS. 7(a) and 7(b). FIGS. 7a and 7b show schematically other arrangements of segments for showing the digits from zero to nine. In FIG. 7a the dashed line indicates an electrical connection between two vertical bars comprising a single segment. Such a connection is shown in more detail in the left hand panel of FIG. 3.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be used to fall therebetween.

What is claimed is:

1. An improved structure for selectively displaying the digits from zero to nine by means of nematic liquid crystals between opposed plates at least one of which is transparent, [comprising] *comprising* a non-conductive first plate having thereon at least one group of seven conductive segments essentially in the conventional [FIG.-8] *figure-8* arrangement, wherein selected segments of said group are electrically connected together to form sub-groups whereby all of the segments in a sub-group may be actuated together; a non-conductive second plate opposed to said first plate and having thereon at least one conductive segmented group in [FIG.-8] *figure-8* arrangement, each group on said second plate being in registry with a group on said first plate and being subdivided into sub-groups of segments, all of the segments in a sub-group being electrically connected; means for applying an activating voltage in pulsed sequence to each of the sub-groups in one group on said first plate at a repetition rate sufficiently great that digits, when displayed, appear to be continuously displayed, and for applying an activating voltage pulse to selected sub-groups of the group on said second plate, the group on said second plate being in registry with said one group on said first plate, said pulsing means being adapted to supply pulses to selected subgroups on said second plate in synchronization with said pulsed sequence applied to said one group on said first plate so as to display any selected digit for the period during which said pulsed voltage sequence is applied to said one group on said first plate, at least one of said plates and the conductive segments on said one plate being transparent.

2. The improved structure of claim 1 wherein there are a plurality of [FIG.-8] *figure-8* groups on said first plate each divided into sub-groups identical with said sub-groups into which said one group is divided, each sub-group in each group being separately pulsable by said voltage-applying means in a sequence such that every sub-group in all groups is pulsed at a high repetition rate; and a plurality of groups on said second plate equal in number to the number of groups on said first plate each of said groups on said second plate being in registry with a group on said first plate, each group on said second plate being divided into sub-groups identical with said sub-groups into which said group on said second plate in registry with said one group on said first plate is divided; electrical leads connecting each sub-group one said second plate with all identical sub-groups on said second plate; said voltage pulsing means being adapted to selectively activate appropriate sub-groups in synchronization with said sequenced pulses in said sub-groups in said groups on said first plate so as to make visible a selected digit by each pair of groups in registry, the digit presented by each pair of groups in registry being independent of the digits presented by other pairs of groups in registry, the pulsing rate being high enough so that the presentation of any digit appears to be continuous.

3. The improved structure as defined in claim 2, wherein the sub-groups into which the segments of the groups on one plate are divided are the top, the top right and the bottom right segments and the top left, the middle, the bottom left, and the bottom segments; and the sub-groups into which the segments of the groups on the other plate are divided are the top and the top left segments, the bottom right and the bottom left segments, the top right and the middle segments and the bottom segment alone, the location of the various segments being related to an observer seeing all groups through the face through which it is intended that said structure will be viewed when in use.

4. The improved structure as defined in claim 2 wherein the sub-groups into which the segments of the groups on one plate are divided are the top, the top right, and the bottom right segments, and the top left, the middle, the bottom left, and the bottom segments; and the sub-groups into which the segments of the groups on the other plate are divided are the top and the top left segments, the top right and the middle segments, the bottom left and the bottom right segments, and the bottom segment alone, the location of the various segments being related to an observer seeing all groups through the face through which it is intended that said structure will be viewed when in use.

5. The improved structure as defined in claim 2 wherein the sub-groups into which the segments of the groups on one plate are divided are the top, the top right and the bottom right segments, the top left, the middle and the bottom left segments, and the bottom segment along; and the sub-groups into which the segments of the groups on the other plate are divided are the top, and the top left segments, the top right and the middle segments, and the bottom left, the bottom and the bottom right segments, the location of the various segments being related to an observer seeing all groups through the face through which it is intended that said structure will be viewed when in use.

6. The improved structure as defined in claim 3 wherein there are 6 groups on each of said plates, the 6 groups on each plate being divided into pairs conveniently disposed for displaying hours, minutes and seconds wherein the left-most group in the two pairs of groups on said first and second plates, disposed for displaying hours, lacks the top-left segment, said left-most groups needing to display only the digits one and two for reading time on a 24-hour basis or to be blank.

*7. A digital display device comprising a non-conductive first plate having thereon at least one group of seven conductive segments essentially in the conventional figure-8 arrangement, wherein selected segments of said group are electrically connected together to form sub-groups whereby all of the segments in a sub-group may be actuated together; a non-conductive second plate opposed to and spaced from said first plate and having thereon at least one conductive segmented group in figure-8 arrangement, each group on said second plate being in registry with a group on said first plate and being subdivided into sub-groups of segments, all of the segments in a sub-group being electrically connected; a material positioned intermediate said first and second plates and adapted so that regions thereof in registration with said conductive segments are displayed when an activating voltage pulse is simultaneously applied to opposed conductive segments on said first and second plates; and means for applying an activating voltage in pulsed sequence to each of the sub-groups in one group on said first plate at a repetition rate sufficiently great that digits, when displayed, appear to be continuously displayed, and for applying an activating voltage pulse to selected sub-groups of the group on said second plate, the group on said second plate being in registry with said one group on said first plate, said pulsing means being adapted to supply pulses to selected subgroups on said second plate in synchronization with said pulsed sequence applied to said one group on said first plate so as to display any selected digit for the period during which said pulsed voltage sequence is applied to said one group on said first plate, at least one of said plates and the conductive segments on said one plate being transparent.*

*8. The digital display device of claim 7 wherein there are a plurality of figure-8 groups on said first plate each divided into sub-groups identical with said sub-groups into which said one group is divided, each sub-group in each group being separately pulsable by said voltage-applying means in a sequence such that every subgroup in all groups is pulsed at a high repetition rate; and a plurality of groups on said second plate equal in number to the number of groups on said first plate each of said groups on said second plate being in registry with a group on said first plate, each group on said second plate being divided into sub-groups identical with said sub-groups into which said group on said second plate in registry with said one group on said first plate is divided; electrical leads connecting each sub-group on said second plate with all identical sub-groups on said second plate; said voltage pulsing means being adapted to selectively activate appropriate sub-groups in synchronization with said sequenced pulses in said sub-groups in said groups on said first plate so as to make visible a selected digit by each pair of groups in registry, the digit presented by each pair of groups in registry being independent of the digits presented by other pairs of groups in registry, the pulsing rate being high enough so that the presentation of any digit appears to be continuous.*

*9. The digital display device as defined in claim 8, wherein the sub-groups into which the segments of the groups on one plate are divided are the top, the top right and the bottom right segments and the top left, the middle, the bottom left, and the bottom segments; and the sub-groups into which the segments of the groups on the other plate are divided are the top and the top left segments, the bottom right and the bottom left segments, the top right and the middle segments and the bottom segment alone, the location of the various segments being related to an observer seeing all groups through the face through which it is intended that said structure will be viewed when in use.*

*10. The digital display device as defined in claim 8, wherein the sub-groups into which the segments of the groups on one plate are divided are the top, the top right, and the bottom right segments, and the top left, the middle, the bottom left, and the bottom segments; and the sub-groups into which the segments of the groups on the other plate are divided are the top and the top left segments, the top right and the middle segments, the bottom left and the bottom right segments, and the bottom segment alone, the location of the various segments being related to an observer seeing all groups through the face through which it is intended that said structure will be viewed when in use.*

*11. The digital display device as defined in claim 8, wherein the sub-groups into which the segments of the groups on one plate are divided are the top, the top right and the bottom right segments, the top left, the middle and the bottom left segments, and the bottom segment alone; and the sub-groups into which the segments of the groups on the other plate are divided are the top, the the top left segments, the top right and the middle segments, and the bottom left, the bottom and the bottom right segments, the*

*location of the various segments being related to an observer seeing all groups through the face through which it is intended that said structure will be viewed when in use.*

*12. The digital display device as defined in claim 9 wherein there are 6 groups on each of said plates, the 6 groups on each plate being divided into pairs conveniently disposed for displaying hours, minutes and seconds wherein*

*the left-most group in the two pairs of groups on said first and second plates, disposed for displaying hours, lacks the top-left segment, said left-most groups needing to display only the digits one and two for reading time on a 24-hour basis or to be blank.*

* * * * *